(12) United States Patent
Cogan et al.

(10) Patent No.: US 9,239,375 B2
(45) Date of Patent: Jan. 19, 2016

(54) ULTRASOUND PROBE WITH DYNAMIC FOCUS AND ASSOCIATED SYSTEMS AND METHODS

(71) Applicant: General Electric Company, Schenectady, NY (US)

(72) Inventors: Scott D. Cogan, Niskayuna, NY (US); Shinichi Amemiya, Tokyo (JP); Bruno Hans Haider, Niskayuna, NY (US); Geir Ultveit Haugen, Oslo (NO)

(73) Assignee: General Electric Company, Niskayuna, NY (US)

( * ) Notice: Subject to any disclaimer, the term of this patent is extended or adjusted under 35 U.S.C. 154(b) by 325 days.

(21) Appl. No.: 13/889,647

(22) Filed: May 8, 2013

(65) Prior Publication Data

US 2014/0334266 A1  Nov. 13, 2014

(51) Int. Cl.
*H04B 1/02* (2006.01)
*G01S 7/52* (2006.01)
*G01S 15/89* (2006.01)
*G10K 11/34* (2006.01)

(52) U.S. Cl.
CPC .......... *G01S 7/5208* (2013.01); *G01S 15/8927* (2013.01); *G10K 11/346* (2013.01); *G01S 7/52095* (2013.01)

(58) Field of Classification Search
CPC  G01S 7/52095; G01S 7/5208; G01S 15/8927
USPC ......................................................... 367/138
See application file for complete search history.

(56) References Cited

U.S. PATENT DOCUMENTS

| | | | |
|---|---|---|---|
| 4,969,132 | A | 11/1990 | Reed |
| 5,817,024 | A | 10/1998 | Ogle et al. |
| 5,964,709 | A | 10/1999 | Chiang et al. |
| 6,471,650 | B2 | 10/2002 | Powers et al. |
| 6,582,369 | B1 | 6/2003 | Huang et al. |
| 6,926,671 | B2 | 8/2005 | Azuma et al. |
| 7,527,592 | B2 | 5/2009 | Haugen et al. |

(Continued)

FOREIGN PATENT DOCUMENTS

| | | |
|---|---|---|
| EP | 1491913 A2 | 12/2004 |
| EP | 2284566 A1 | 2/2011 |
| WO | 2007039972 A1 | 4/2007 |

OTHER PUBLICATIONS

Azar et al., "Beam Focusing Behavior of Linear Phased Arrays", NDT & E International, vol. 33, Issue 3, pp. 189-198, Apr. 2000.

(Continued)

*Primary Examiner* — Mark Hellner
(74) *Attorney, Agent, or Firm* — Seema S. Katragadda (57) ABSTRACT

Exemplary ultrasound probes with sub-aperture processing capable of dynamic focus are provided that generally include an array of transducer elements that form a sub-aperture in the ultrasound probe. The transducer elements can be assigned to dynamic delay update groups and an initial delay can be applied to ultrasound signals associated with the transducer elements of the sub-aperture. A sub-aperture processor can be configured to dynamically apply delay updates to the ultrasound signals associated with the transducer elements of the sub-aperture according to the dynamic delay update groups to which the transducer elements are assigned. Exemplary ultrasound systems with a dynamic focus and methods of transmitting ultrasound signals with a dynamic focus are also provided.

22 Claims, 9 Drawing Sheets

(56) References Cited

U.S. PATENT DOCUMENTS

| | | | |
|---|---|---|---|
| 7,635,334 | B2 | 12/2009 | Phelps |
| 8,177,718 | B2 | 5/2012 | Savord |
| 2002/0045823 | A1 | 4/2002 | Fraser |
| 2005/0243812 | A1* | 11/2005 | Phelps .......................... 370/360 |
| 2006/0116580 | A1* | 6/2006 | Fukukita ....................... 600/447 |
| 2010/0298714 | A1 | 11/2010 | Miyajima |
| 2012/0083695 | A1 | 4/2012 | Napolitano et al. |
| 2012/0095344 | A1 | 4/2012 | Kristoffersen et al. |

OTHER PUBLICATIONS

Li et al., "Efficient Dynamic Focus Control for Three-Dimensional Imaging Using Two-Dimensional Arrays", IEEE Transactions onUltrasonics, Ferroelectrics and Frequency Control, vol. 49, Issue 9, pp. 1191-1202, Sep. 2002.

Brunner, "How Ultrasound System Considerations Influence Front-End Component Choice", Analog Dialogue, Inc., 36-03, 2002, available at http://www.analog.com/library/analogDialogue/archives/36-03/ultrasound/ultrasound.pdf.

Blaak et al., "Design of a Micro-Beamformer for a 2D Piezoelectric Ultrasound Transducer", IEEE International Ultrasonics Symposium (IUS), pp. 1338-1341, Sep. 20-23, 2009, Location: Rome.

Palmese et al., "An Efficient Digital CZT Beamforming Design for Near-Field 3-D Sonar Imaging", IEEE Journal of Oceanic Engineering, vol. 35, Issue 3, pp. 584-594, Jul. 2010.

PCT Search Report and Written Opinion issued in connection with corresponding Application No. PCT/US2014/036574 on Aug. 8, 2014.

\* cited by examiner

ULTRASOUND PROBE WITH DYNAMIC FOCUS AND ASSOCIATED SYSTEMS AND METHODS

TECHNICAL FIELD

The present disclosure relates to ultrasound probes and associated systems and methods and, in particular, to ultrasound probes with sub-aperture beamforming and dynamic focus with a simplified dynamic delay updating mechanism.

BACKGROUND

Conventional ultrasound systems generally include an ultrasound probe formed from a plurality of transducers which define an aperture of the ultrasound probe. The transducers can be arranged spatially and can be divided into a plurality of sub-apertures or sub-arrays. Sub-aperture processors (SAPs) may perform beamforming operations for the elements within the sub-aperture, on both transmit and/or receive operations. A typical ultrasound system generally further includes a receive and/or transmit beamformer that is external to the probe and that is connected to the transducer elements by electrical cables.

The beamformer generally focuses and steers ultrasound energy transmitted and received by the probe to acquire acoustic reverberation data as one step in generating images of anatomic content on a display. In particular, the transmit beamformer generates pulse or continuous signals and the plurality of transducers convert electrical signals to pressure waves and vice versa. The pressure waves generally propagate through tissue and part of the ultrasound energy is reflected back to the transducers. The receive beamformer processes the received ultrasound echoes and focuses the energy. The ultrasound signals are then processed and converted into an audio output and/or a visual display at a graphical user interface (GUI).

As described above, each ultrasound waveform is output by the probe via a respective channel. In conventional (non-3D) ultrasound systems, each transducer element is normally associated with a distinct cable or wire connecting the probe to the beamformer to facilitate processing of the respective ultrasound signal, e.g., geometrical calculations are required for each transducer element for steering. For 3D ultrasound systems with thousands of individual elements, a distinct cable is not feasible. To deal with the thousands of elements, transmission is handled by distribution of a set of transmit signals from the system or with transmitters in the probe. Receiving is handled with a combination of beamforming in the probe and/or system. The probe beamforming can be analog and/or digital. A digital solution requires an analog-to-digital (ADC) converter in the probe. Since each channel can have an ADC, some implementations can require thousands of ADCs. As a result, the implementation of a beamformer in the probe may require one or a plurality of application specific integrated circuits (ASIC) and a technical solution that makes it possible to fit the circuitry needed within the required restrictions on silicon area, power, setup data, calculation time, and the like.

Thus, a need exists for ultrasound probes with means for reducing the complexity for implementing a dynamic beamformer. These and other needs are addressed by the ultrasound probes and associated systems and methods of the present disclosure.

SUMMARY

In accordance with embodiments of the present disclosure, exemplary ultrasound probes with sub-aperture processing capable of dynamic focus are provided that generally include groups or arrays of transducer elements that form sub-apertures in the ultrasound probe. The transducer elements of the sub-apertures can transmit and/or receive ultrasound signals. An initial delay can generally be applied to ultrasound signals associated with the individual transducer elements of the sub-apertures. The exemplary ultrasound probes generally include a sub-aperture processor configured to dynamically apply delay updates to the ultrasound signals associated with the transducer elements of the sub-apertures. In order to simplify the implementation, the transducer elements can be assigned to one out of a plurality of dynamic delay update groups, where transducer elements within an update group can apply the same delay updates at the same delay updates at the same rate and/or magnitude. The sub-aperture processor can therefore be configured to dynamically apply delay updates to the ultrasound signals repeatedly for a predetermined time period to approximate an ideal delay profile, with the frequency of the delay updates being configurable per sub-aperture processor and the magnitude of the delay updates being dependent on the dynamic delay update groups to which the transducer elements are assigned.

The sub-aperture processor can assign the transducer elements to the plurality of dynamic update groups by configuring the sub-aperture processor to apply a first delay modification to a first group of transducer elements within the sub-apertures and a second delay modification to a second group of transducer elements within the sub-apertures. This process can be repeated for the plurality of dynamic update groups. The delay modifications of each delay update group can be different from the delay modification of the other delay update groups. A delay modification of the delay update group can have an opposite sign of a delay modification of another delay update group. One or more of the delay update groups may not receive a delay modification. In some exemplary embodiments, the delay modifications can be static.

The dynamic delay update groups within the sub-apertures can be updated at two or more different rates. Alternatively, the delay updates may be applied at the same rate, but using two or more different delay update magnitudes. The delay updates applied by the sub-aperture processor can be a curved or piecewise linear approximation of an ideal delay profile associated with the transducer elements in the dynamic delay update groups. The sub-aperture processor can be configured to apply the initial delay to the ultrasound signals to substantially align the phase of the ultrasound signals initially received by the sub-aperture elements. The sub-aperture processor can be further configured to apply delay updates to the dynamic delay update groups to substantially align the ultrasound signals received by the transducer elements in phase for the sub-aperture as a function of time.

The sub-aperture processor can be configured for processing of a plurality of beams. For example, the sub-aperture process can be configured to process a first beam with a first set of dynamic delay update parameters and a second beam with a second set of dynamic delay update parameters. The first set of dynamic delay update parameters can be different from the second set of dynamic delay update parameters, and the delay update group assignments may also be different form one beam to the next. To process a first beam direction, the sub-aperture processor can be set up in accordance with the above-described scheme to beamform the ultrasound signals from the direction of the first beam. To process a second beam direction, the sub-aperture processor can be set up in accordance with the above-described scheme to beamform the ultrasound signals from the direction of second beam. In some embodiments, rather than being connected to the transducer elements directly, the receive beamformer can be connected to the sub-aperture processor electronics. This exemplary set-up can be repeated for each beam in the plurality of beam directions. The sub-aperture processor can be further configured to set a rate for applying discrete delay updates to ultrasound signals associated with the transducer elements of the sub-apertures. Further, the sub-aperture processor can be configured to set a magnitude of the initial delay applied to ultrasound signals associated with the transducer elements of the sub-apertures. The delay updates can be one of, e.g., an incremented delay, a static delay, a decremented delay, and the like.

The sub-aperture processor can be configured to apply a set of initial delays to ultrasound signals associated with the transducer elements of the sub-apertures. Further, the sub-aperture processor can be configured to begin applying the delay updates to ultrasound signals associated with the transducer elements of the sub-apertures in response to a counter, e.g., a start counter, and the like. In addition, the sub-aperture processor can be configured to continue applying delay updates at intervals specified by a counter, e.g., a rate counter, and the like. The sub-aperture processor can further be configured to stop applying the delay updates to ultrasound signals associated with the transducer elements of the sub-apertures in response to a counter, e.g., a stop counter, and the like. In some embodiments, the counter can be part of a controller. Although a counter is used in relation to sub-aperture control, it should be understood that in some embodiments, other types of control circuitry can be used.

In accordance with embodiments of the present disclosure, exemplary ultrasound systems with a dynamic focus are provided that include an ultrasound probe including an array or group of transducer elements that form a sub-aperture(s). The exemplary systems further include a sub-aperture processor configured to apply an initial delay to ultrasound signals associated with the transducer elements of the sub-apertures. The transducer elements of the sub-apertures can be assigned to dynamic delay update groups. The sub-aperture processor can be further configured to dynamically apply delay updates to the ultrasound signals repeatedly for a predetermined time period to approximate an ideal delay profile. The delay updates can be configurable per sub-aperture processor. A magnitude of the delay updates can be dependent on the dynamic delay update groups to which the transducer elements are assigned.

The sub-aperture processor generally includes at least one counter, e.g., a start counter, a rate counter, a stop counter, and the like. The sub-aperture processor can be configured to apply the initial delay to ultrasound signals associated with the transducer elements and apply delay updates in response to the at least one counter. The sub-aperture processor can be further configured to apply discrete delay updates to ultrasound signals associated with the transducer elements at a specific rate each time the at least one counter reaches a specified value and to stop the delay updates after a specified number of delay updates has been completed.

In accordance with embodiments of the present disclosure, exemplary methods of receiving and/or transmitting ultrasound signals with a dynamic focus are provided that generally include applying an initial delay to ultrasound signals associated with transducer elements of a sub-aperture disposed in an ultrasound probe. The methods generally include assigning the transducer elements of the sub-aperture to dynamic delay update groups. Further, the exemplary methods generally include applying delay updates to the ultrasound signals repeatedly for a predetermined time period to approximate an ideal delay profile. A frequency of the delay updates can be configurable per sub-aperture processor. A magnitude of the delay updates can be dependent on the dynamic delay update group to which the transducer elements are assigned.

The exemplary methods can include transmitting ultrasound signals via the transducer elements of the sub-apertures and applying the initial delay to the ultrasound signals via a sub-aperture processor to specify a focal point or the desired focus information for the ultrasound signals. The exemplary methods further include receiving ultrasound signals via the transducer elements of the sub-apertures and applying the delay updates to the ultrasound signals via a sub-aperture processor to substantially align the ultrasound signals received by the transducer elements in phase for each of the dynamic delay update groups.

The exemplary methods can include processing a first beam using a first set of dynamic delay update parameters and a second beam using a second set of dynamic delay update parameters. The first set of dynamic delay update parameters can be different from the second set of dynamic delay update parameters. The exemplary methods generally include applying different delay increments or decrements for the delay updates for each of the first and second set of dynamic delay update parameters. Further, the exemplary methods include applying different delay update periods for the delay updates for each of the first and second set of dynamic delay update parameters. In general, the exemplary methods include setting a rate for discretely applying the delay updates to ultrasound signals associated with the transducer elements of the sub-apertures.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed devices and associated systems and methods, reference is made to the accompanying figures, wherein.

DESCRIPTION OF EXEMPLARY EMBODIMENTS

Figure 1:
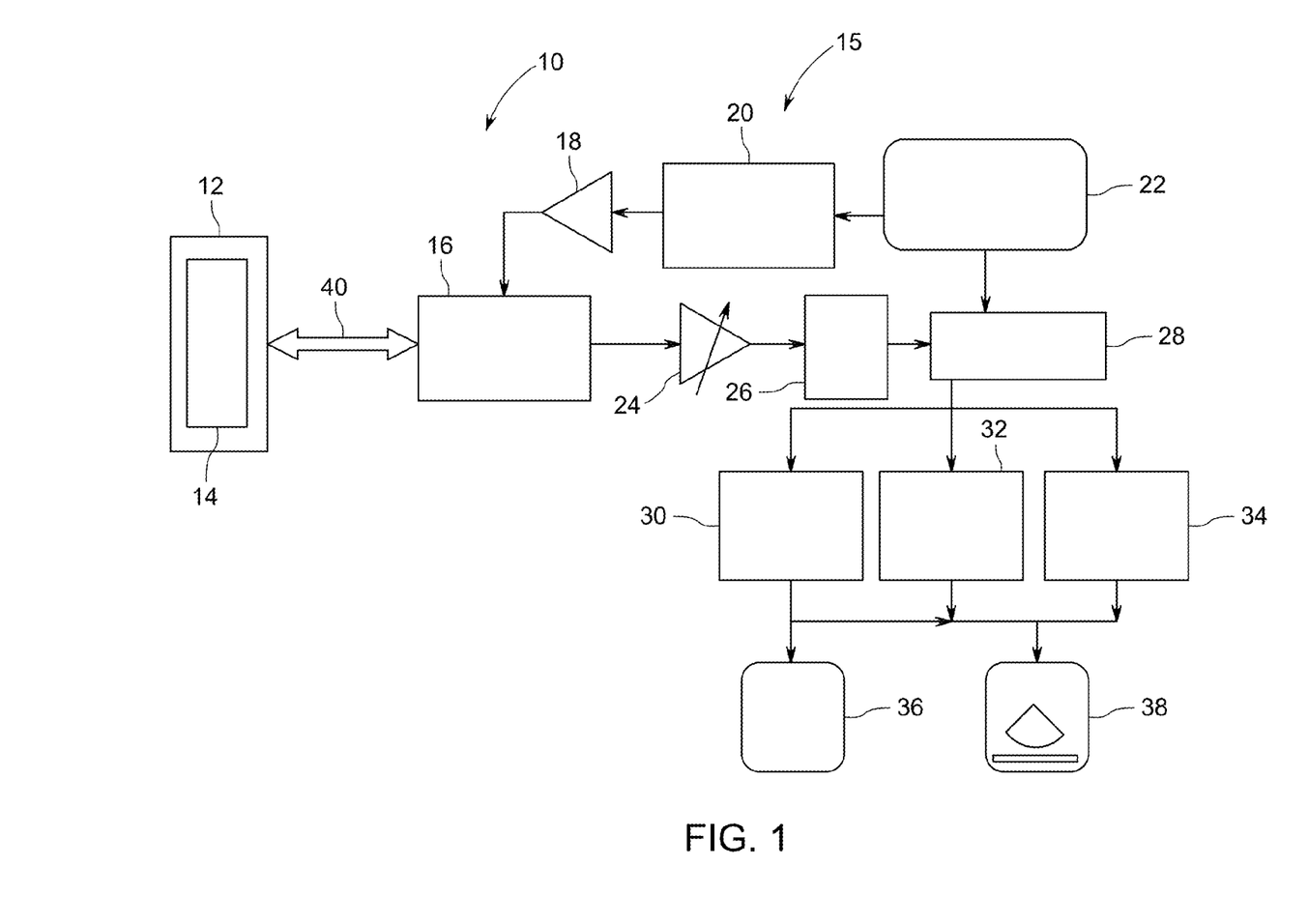
FIG. 1 shows block diagrams of an exemplary ultrasound system.
Figure 2:
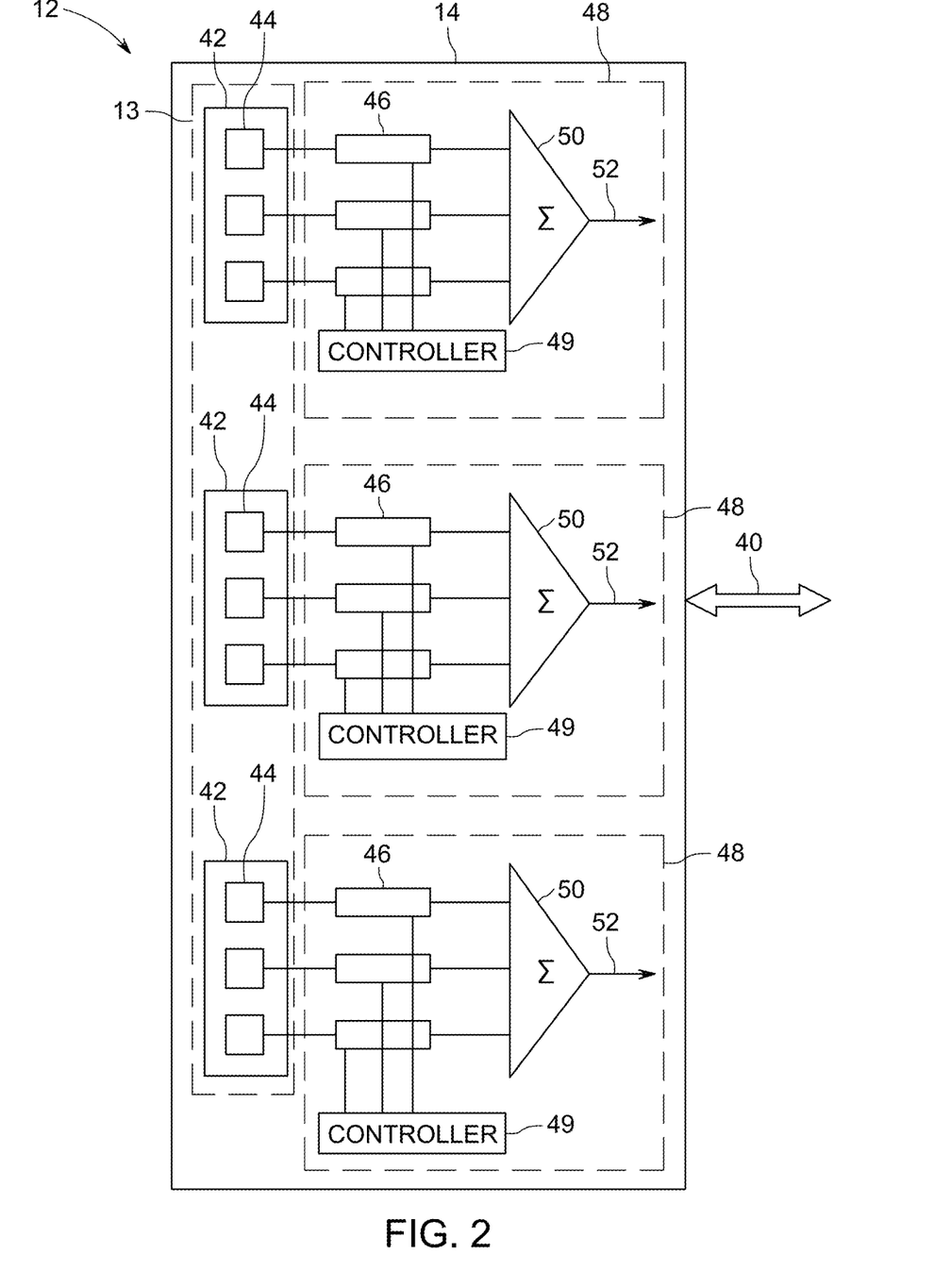
FIG. 2 shows an exemplary block diagram of a ultrasound probe including sub-aperture processors to illustrate a receive mode of operation.

FIGS. 1 and 2 show an exemplary ultrasound system 10 of the present disclosure. Referring to FIG. 1, the system 10 generally includes an ultrasound probe 12 that includes an aperture assembly 14 formed from a plurality of transducer elements that define an aperture of the probe 12. The main ultrasound processing unit 15 generally includes a transmit beamformer 20 connected to the transducer elements by electrical cables 40. The system 10 can further include a high voltage transmit amplifier 18 (HV Tx AMP) for amplifying the transmit signals from the beamformer 20 and multiplexer/demultiplexer and transmit/receive switches 16 (MUX/DEMUX and T/R switches). A beamformer central control system 22 can be utilized to control the beamformer 20. The beamformer 20 can range from a pure setup/delay control to a full pulse transmitter depending on the chosen design.

The main ultrasound processing unit 15 can also include a time gain compensation amplifier 24 (TGC), an analog-to-digital converter 26 (ADC), and a receive beamformer 28 for receiving ultrasound energy signals. The received ultrasound signals can further be processed by, e.g., spectral Doppler processing 30, image and motion processing 32, color Doppler processing 34, and the like. The transmit beamformer 20 generates pulse or control signals and the plurality of transducer elements convert electrical signals to pressure waves which propagate through tissue and reflect back to the transducer elements. The receive beamformer 28 processes the received ultrasound echoes and focuses the energy. The ultrasound signals are then processed and converted into an audio output 36 and/or a visual display 38 at a graphical user interface (GUI).

Referring now to FIG. 2, the ultrasound probe 12 includes an aperture assembly 14 that is generally formed from a plurality of transducers elements 44 that define an aperture 13 of the probe 12. The transducers elements 44 can be arranged spatially and may be divided into a plurality of sub-apertures 42 (SAs 42) or sub-arrays for both transmit and receive operations. Each SA 42 of the transducer elements 44 can include a dedicated sub-aperture processor 48 (SAP 48). The transducer elements 44 can individually receive an initial delay. In some embodiments, the transducer elements 44 can be grouped for receiving the same frequency and/or magnitude of a delay.

The sub-aperture processor 48 can be configured to regulate and/or control the application of delay elements 46 for example by dynamically controlling and/or applying initial delays, delay updates, and the like, to ultrasound signals received and output by the transducer elements 44 via a controller 49. The delay elements 46 can be dynamically controlled and/or applied by the controller 49 to substantially align the phase of the ultrasound signals received by the transducer elements 44. The dynamic processing of ultrasound signals by the controller associated with the transducer elements 44 occurs at the sub-aperture processor level of the exemplary aperture assembly 14. A dedicated summation element 50 can be implemented in each SAP 48 to combine the plurality of phase-aligned ultrasound signals from the transducer elements 44 associated with a particular SAP 48 into a single ultrasound signal 52, i.e., a single channel. The ultrasound signals 52 for each SA 42 can further be output from the probe 12 to a main ultra sound processing unit 15 via a cable 40.

While FIG. 2 is illustrative of one exemplary embodiment, in which each SAP 48 can include a separate controller 49, those skilled in the art will recognize that one controller 49 can be operatively coupled to each of the delay elements 46 in each of the SAPs 48. Additionally, or in the alternative, the controller(s) 49 can be external to the probe 12, and can, for example, be implemented within the main processing unit 15.

Figure 3:
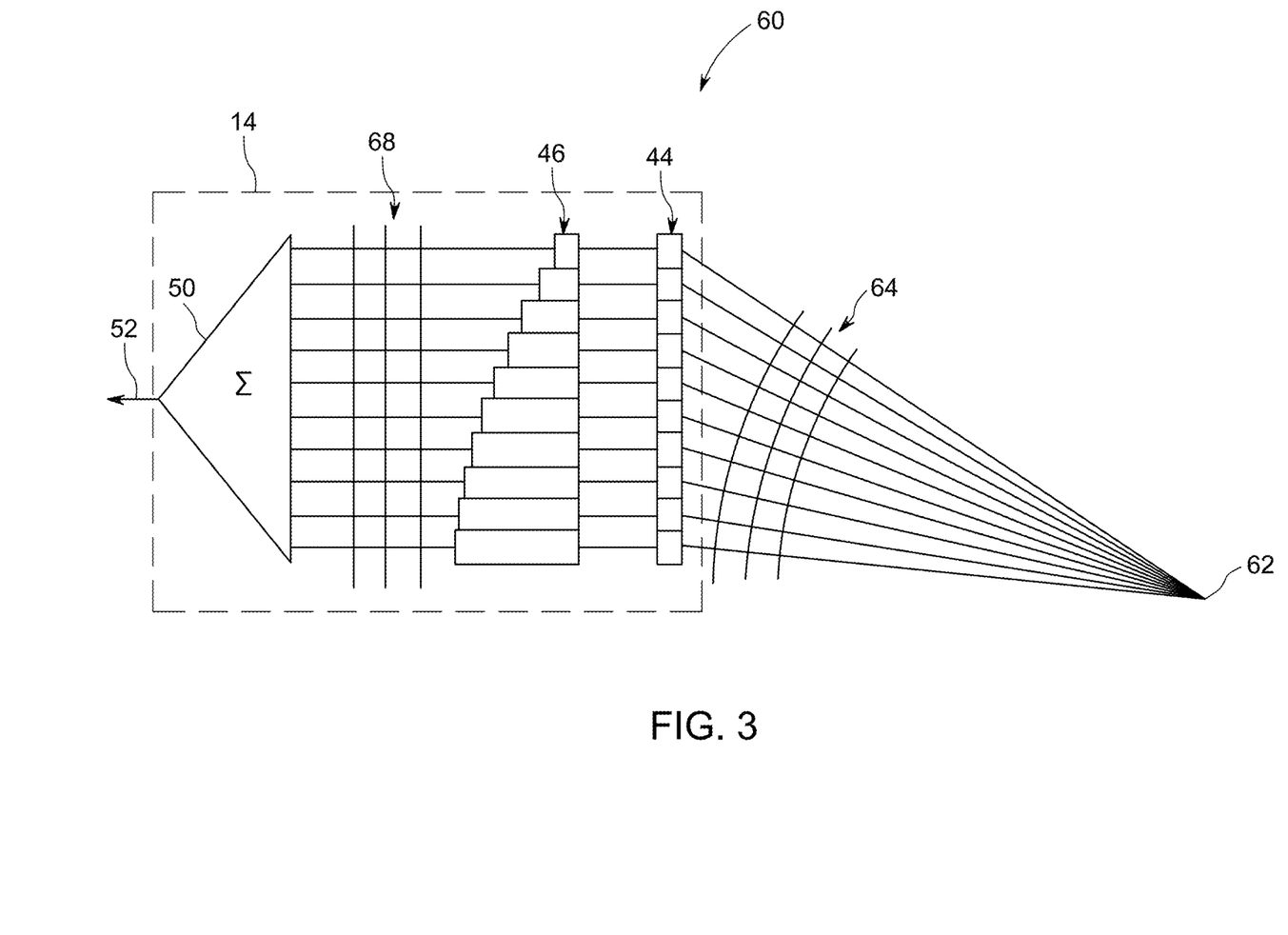
FIG. 3 shows a block diagram of an exemplary beamforming system.

FIG. 3 shows an exemplary beam 60 being received by an exemplary embodiment of one of the sub-apertures 42 and processed by an exemplary embodiment of the sub-aperture processor 48. The transmit beamformer 20 generally generates spherical signals such that a spherical wave of ultrasound signals is generated which focuses at a particular point. Thus, the timing for each ultrasound signal is slightly different than the other ultrasound signals, which can be defined by an arc-shaped delay pattern of ultrasound signals. For example, as illustrated in FIG. 3, pulses are initially generated by a beamformer 20 and reflected pulses are received by transducer elements 44 of the sub-aperture 44. The transmitted ultrasound signals can be reflected from a particular focal point 62. Waveforms 64 illustrate the arc-shaped delay patterns of the ultrasound signals prior to correction. Each reflected waveform 64 can be received by a respective transducer element 44 and apply the corresponding delay, e.g., an arc-shaped delay pattern, with delay elements 46. The arc-shaped waveforms 64 of sub-aperture 42 can further be dynamically corrected, i.e., dynamically steered or focused, with delay elements 46 of the sub-aperture processor 48 at correction stage 68 to create a phased-aligned version of the waveforms 64. The lineated waveforms 64 may further be summed by an exemplary embodiment of the summation element 50 at a summing stage and output as a single signal 52 to be processed. Thus, rather than implementing separate channels for each waveform 64 received by the transducer elements 44, the waveforms 64 can be phase-aligned and summed for each SA 42 and transferred to main processing unit 15.

Figure 4:
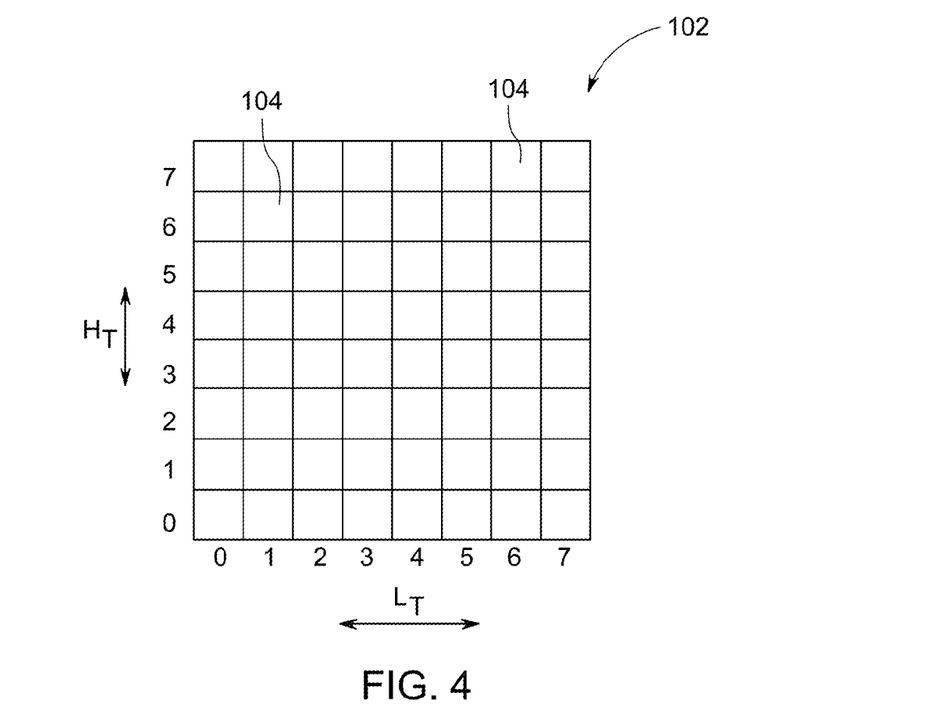
FIG. 4 shows an exemplary transducer with a two-dimensional array of sub-apertures.

FIG. 4 illustrates an exemplary aperture 102 that includes an 8×8 two-dimensional array of SAs 104 for one application-specific integrated circuit (ASIC). Although illustrated as an 8×8 array of SAs 104, it should be understood that in some exemplary embodiments, the aperture 102 can include a variety of SA 104 arrays. The ASIC associated with aperture 102 may also include a periphery input/output region for communicating the ultrasound signals between the ultrasound probe and the ultrasound signal processing system (not shown), e.g., a computer, a processing device, and the like. In some exemplary embodiments, the transducer length $L_T$ can be approximately 10 mm and the transducer height $H_T$ can be approximately 10 mm. For other exemplary embodiments, the transducer length $L_T$ and the transducer height $H_T$ can depend on the desired aperture for the probe type in question and whether more than one ASIC is utilized to span the desired aperture.

Figure 5:
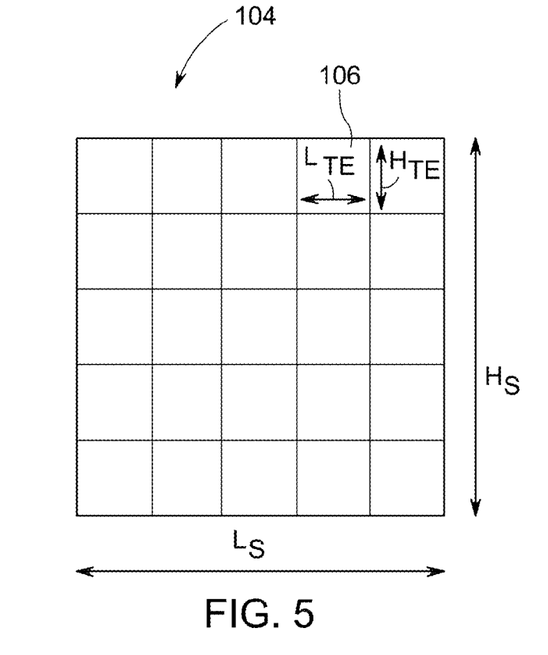
FIG. 5 shows an exemplary sub-aperture with a two-dimensional array of transducer elements.
Figure 6:
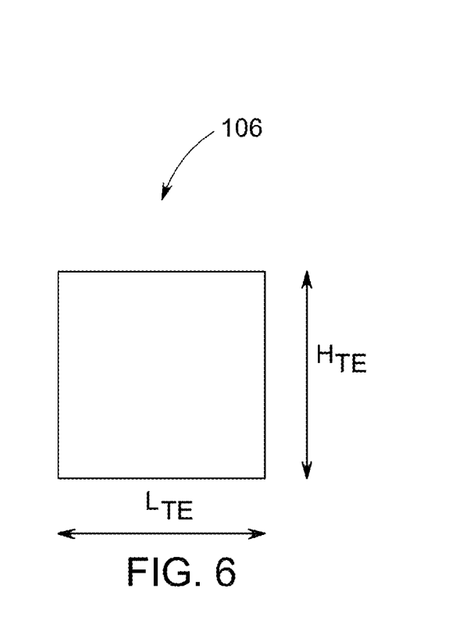
FIG. 6 shows an exemplary transducer element.

FIG. 5 illustrates an exemplary SA 104 of the aperture 102. In particular, the individual SA 104 includes a 2D array of transducer elements 106. It should be noted that the use of "2D array" in this context refers to indexing of the SA elements. The physical transducer elements 106 can be located along any spatial surface in 3D. Although illustrated as a 5×5 array of transducer elements 106, in some exemplary embodiments, the 2D array can be, e.g., 5×3, 5×6, 10×5, and the like. For the exemplary SA 104 of FIG. 5, the SAP length $L_S$ can be approximately 1.25 mm and the SAP height $H_S$ can be approximately 1.25 mm. The SA 104 geometry can be selected such that a single ASIC can be implemented for a number of applications which span RX frequencies (i.e., receive frequencies) between, e.g., approximately 1 MHz and approximately 12 MHz, and the like, and support systems with channel counts between, e.g., approximately 16 channels and approximately 512 channels. For a full probe beamformer, the channel count can be as low as one. For example, in some exemplary embodiments, a 5×5 2D array of SAs 104 may be implemented with the option of combining multiple SAs 104 together to create larger SAs 104 with different geometries. As described above, each SA 104 can include a dedicated sub-aperture processor for controlling the delays applied to the received ultrasound signals. Each sub-aperture processor thereby applies delays to transducer elements 44 associated with the respective sub-aperture processor. FIG. 6 shows an exemplary transducer element 106 of an SA 104. An exemplary transducer element length $L_{TE}$ can be approximately 250 μm and the transducer element height $H_{TE}$ can be approximately 250 μm.

In exemplary embodiments, the ultrasound probe supports dynamic focusing, i.e., steering, for each sub-aperture using a sub-aperture processor within a beamforming ASIC. Dynamic focusing for the SAs 104 allows the sub-aperture processor to dynamically track the desired steering/focus along any receive beam vector in 3D. In particular, as will be described in greater detail below, the exemplary method of dynamic beamforming involves approximating the beamforming delays over the range of the beam and making incremental delay updates to reconfigurable groups of elements at specified intervals.

Figure 7A:
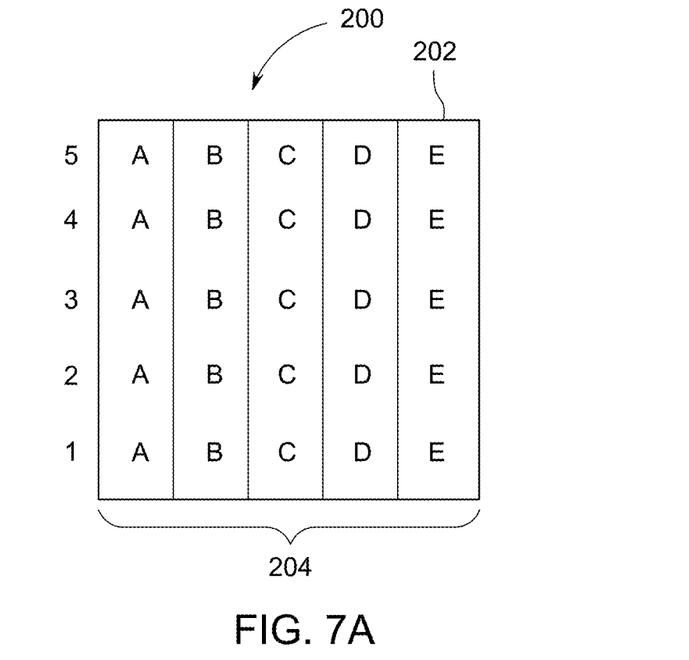
FIGS. 7A and 7B show exemplary sub-apertures with an exemplary grouping into dynamic delay update groups.
Figure 7B:
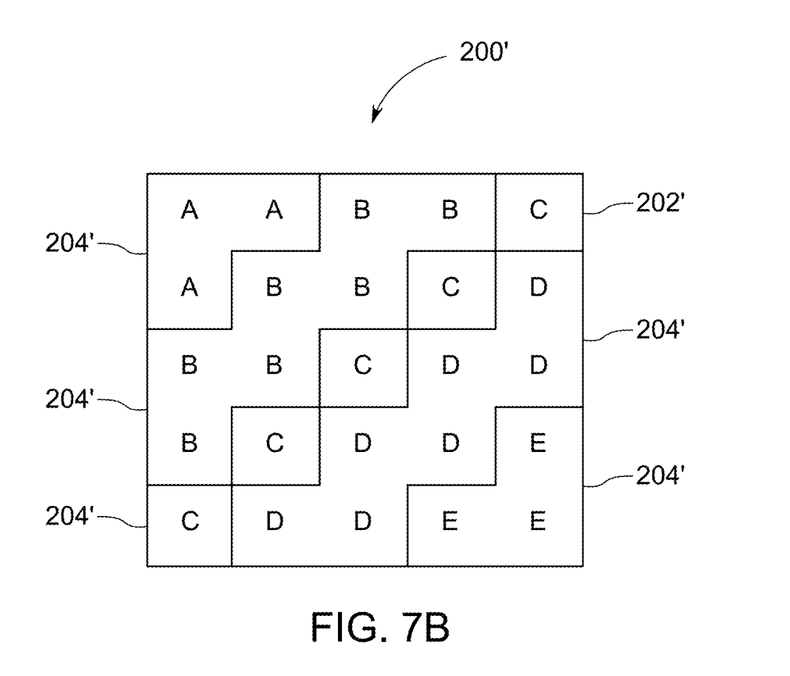

FIG. 7A shows an exemplary SA 200 which includes a 5×5 2D array of transducer elements 202. The exemplary methods include assigning the transducer elements 202 of the SA 200 to dynamic delay update groups 204, e.g., groups A, B, C, D and E. Transducer elements 202 within the same delay update group 204 will receive the same delay updates for, e.g., a +20 nanosecond increment or a −20 nanosecond decrement at a certain time interval. Transducer elements 202 in some delay update groups 204, e.g., group C, may have a static delay, and therefore do not receive any delay updates. Although illustrated as five dynamic delay update groups 204, in some exemplary embodiments, any other number of dynamic delay update groups 204 may be implemented. The number of dynamic delay update groups 204 may depend on the SA 200 size. Ultrasound signals received by the respective transducer elements 202 can be sampled, delayed and/or summed within the sub-aperture processor for each SA 200. Each sub-aperture processor applies an initial delay profile to the individual transducer elements 202 and the delays associated with each transducer element 202 can further be updated dynamically over time. In particular, the initial delay and the updated delays can be applied by the sub-aperture processor to delay elements that receive ultrasound signals from the transducer elements 202 to realize a dynamic updated steering/focusing direction. In some exemplary embodiments, the initial delay can be, e.g., approximately 10, 20, 30, and the like, nanoseconds. The delay elements associated with each of the transducer elements 202 of the SA 200 can be configured to support, e.g., a substantially similar initial delay, different initial delays, and the like. FIG. 7B shows another exemplary SA 200' which includes a 5×5 2D array of transducer elements 202' which are assigned to dynamic delay update groups 205', e.g., groups A, B, C, D and E. Many different grouping patterns are possible, two of which are illustrated in FIGS. 7A and 7B.

While the ultrasound signals are received by the transducer elements 202, the sub-aperture processor can apply delay updates, e.g., incremented delays, decremented delays, static delays, and the like, to the ultrasound signals associated with the transducer elements 202 based on the groups 204 to which the transducer elements 202 are assigned. The delay updates can be applied to substantially align in phase the ultrasound signals received by the transducer elements 202. The steering update patterns indicate a direction, or rotary axis, about which the steering updates should be applied. The different update patterns can be approximated with a relatively small number of possible grouping assignments in order to simplify the required circuitry. For example, sixteen different rotary axis patterns may be supported, two of which are shown in FIGS. 7A and 7B. The different delay update groups may apply delay increments or decrements at various intervals or magnitudes.

Figure 8:
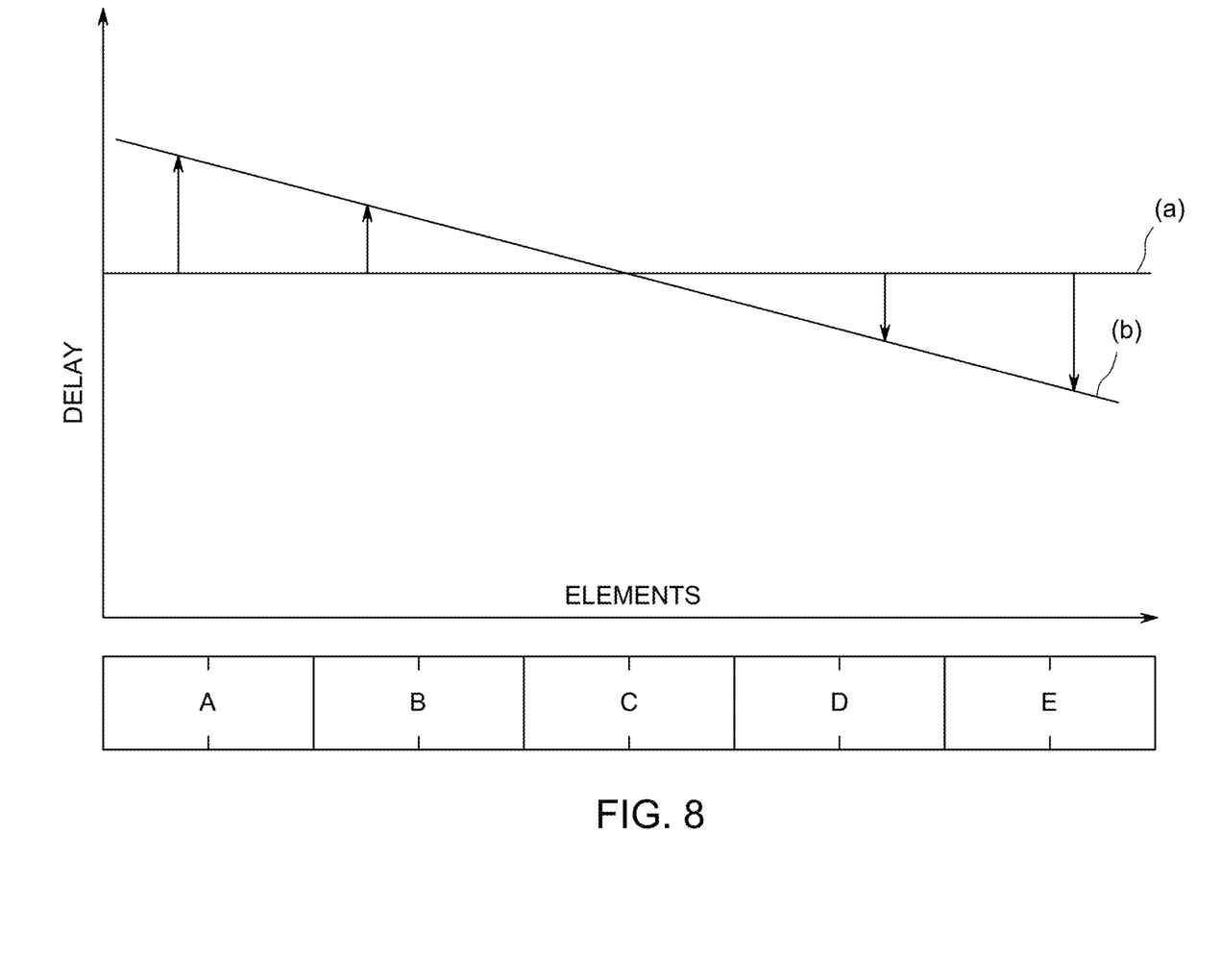
FIG. 8 shows an exemplary delay profile for a sub-aperture with grouped transducer elements.

FIG. 8 shows an exemplary delay profile for five elements within a SAP with delay changes over time for each delay update group, e.g., A, B, C, D and E. In particular, plotline (a) illustrates an initial delay applied to delay elements for each of the transducer elements associated with the SAP, resulting in a flat profile and a signal directed straight at a focal point. As long as the relative delay between delay elements stays constant, the SAP maintains a static focus which generally does not change. The initial SAP focus can be determined by Δx and Δy steering parameters, which specify the delay slope in the x and y directions. Relative delays in the SAP can be updated at regular intervals by the SAP such that the focus direction of the SAP is changed. The time period for applying the delay updates can be, e.g., approximately 500 nanosecond steps.

Plotline (b) illustrates an exemplary final delay profile after all delay updates have finished. In particular, plotline (b) illustrates a gradual transition from the initial delay profile to a far field profile as the sub-aperture processor applies the delay updates at regular intervals to the ultrasound signals associated with the grouped transducer elements. As would be understood by those of ordinary skill in the art, by applying the delay updates to the ultrasound signals, the ultrasound signals received can be substantially aligned in phase for each of the dynamic delay update groups. As the delay updates are applied to the ultrasound signals, the steer/focal direction for the SAP can be moved. In this exemplary case, the delays for transducer elements in groups A and E are incremented and decremented at twice the rate, or twice the magnitude, of the transducer elements in groups B and D. The delays for transducer elements in group C remain static.

Figure 9:
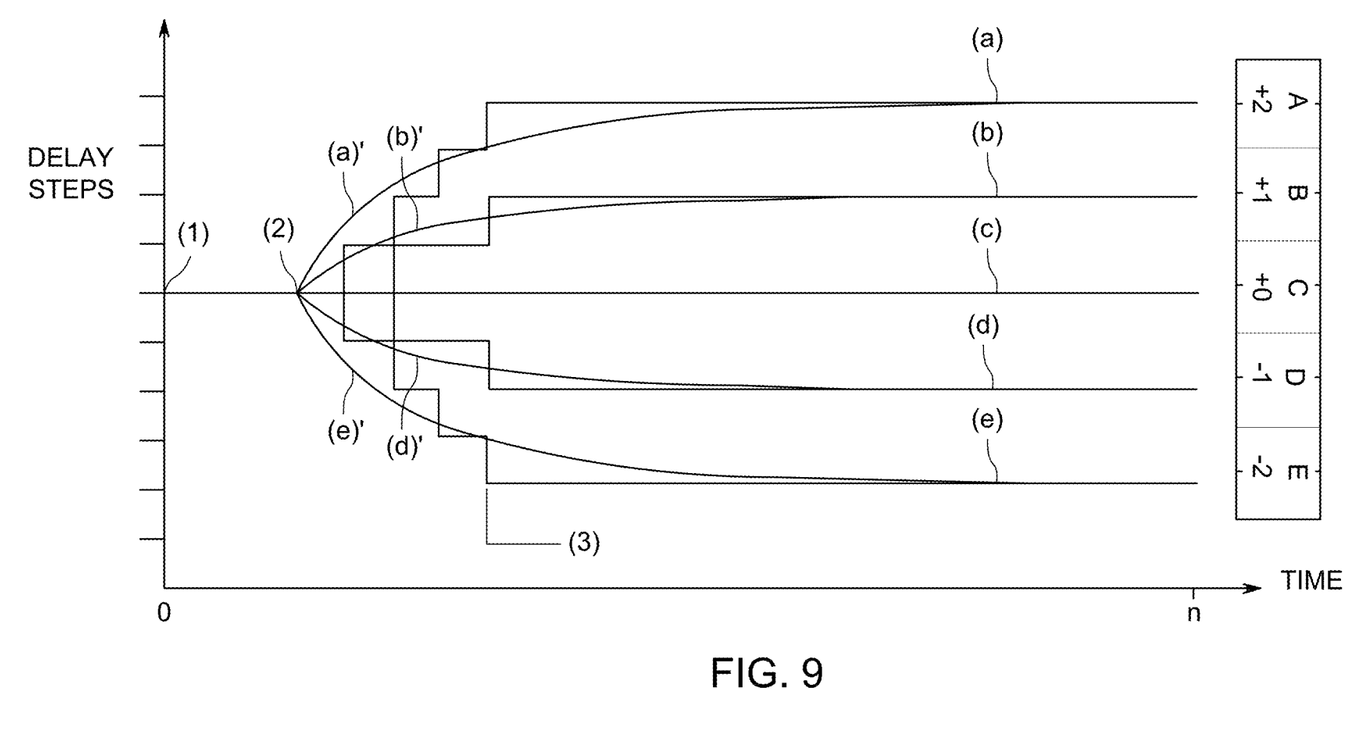
FIG. 9 shows an exemplary delay profile approximation with delay increments and decrements based on dynamic delay update groups.

FIG. 9 shows how an exemplary delay profile works in conjunction with the dynamic delay update groups 204, i.e., groups A, B, C, D and E. At time 0 (point 1), the beam starts. At point 2, the dynamical delay update increments start and can be applied to the ultrasound signals of the transducer elements 202 based on the group 204 assignment. Although the magnitude of the delay updates remains constant, the rate at which the delay updates are applied can be varied by changing the update rate for each group 204. In some embodiments, the delay updates may be applied at the same rate while using two or more different delay update magnitudes. Ideally, the delays associated with each transducer element will change smoothly or gradually over time. However, these ideal delay curves can be effectively approximated in a simple manner with a certain number of quantized delay update steps. In the exemplary delay profile approximation shown in FIG. 9, it should be understood that curves (a)', (b)', (c)', (d)' and (e)' are the exemplary ideal element delays. Curves (a), (b), (c), (d) and (e) are the corresponding quantized element delays. In particular, curve (a) for group A approximates the ideally desired curve (a)', curve (b) for group B approximates curve (b)', curve (d) for group D approximates curve (d)', curve (e) for group E approximates curve (e)', and curve (c) for group C remains constant. While groups A and E receive delay updates from the sub-aperture processor based on a rate counter at, e.g., 500 nanosecond intervals, the rate counter can apply the delay updates to groups B and D at 1000 nanosecond intervals, half the rate of groups A and E. Further, groups A and E receive delay updates in opposite directions, i.e., a +20 nanosecond update for each increment and a −20 nanosecond update for each decrement, respectively. Similarly, groups B and D receive delay updates in opposite directions. Meanwhile, group C remains static with no change in the delay signal. At point 3, the dynamic updates can be stopped and, as can be seen from FIG. 9, at time n, the dynamic focus of the exemplary ultrasound probe substantially aligns the ultrasound signals received by the transducer elements in phase for each of the dynamic delay update groups. Residual beamforming errors from point 3 and onward are demonstrated to be small and of little significance.

In some exemplary embodiments, an ideal delay profile for an ultrasound signal received by a transducer element can generally be approximated with a simple piecewise linear approximation with three segments. During the first segment of time, the initial delay remains static. During the second segment, delay updates begin and effectively approximate a certain delay update rate over time. During the third segment, the delay updates cease and delays remain static for the remainder of the receive period. The timing for these segments may be accomplished simply with three counters, e.g., a START counter, a RATE counter, and a STOP counter. For example, at point 1, the sub-aperture processor can apply an initial delay profile, i.e., an initial depth, to the transducer elements, which remains constant for a period of time specified by a start counter. Once the start counter has reached a specified value at point 2, the delays within the sub-aperture processor can be updated according to the groups with which they are associated. In particular, the delay updates can be incremented at some multiple of a rate counter, which determines the time between updates, thereby controlling the slope of the delay profile updates. The application of the delay updates can be seen in FIG. 9 as the steps which approximate the ideal delay profile plotline. Between points 2 and 3, i.e., a mid field position, the approximation delay updates can be seen to more closely track the ideal delay profile. The number of delay updates can be counted by a stop counter and, at point 3, i.e., the stop depth, the approximation delay updates are stopped by the sub-aperture processor. The delays for the transducer elements will thereby remain constant for the remainder of the receive period for the beam.

An optimal sub-aperture processor steering/focusing direction will change with depth. Ideally, the sub-aperture processor delay profiles can update along the receive beam to be ideally steered for every depth of interest. The desired delay updates can be calculated by subtracting the ideal near-field or initial delay profile form the ideal far-field delay profile. The residual delay pattern is the sum of the desired dynamic delay updates which should be applied gradually as the depth of focus increases, such that the sub-aperture processor steering tracks the desired focal point dynamically.

The preferred delay update group pattern, or rotary axis, can be determined by the delay updates required in the x and y directions. Each rotary axis requires some switches in the ASIC. To keep the complexity low, it is desirable to use a limited number of rotary axes. In some exemplary embodiments, 16 rotary axes provide 22.5 degree SAP steering resolution. In other exemplary embodiments, 8 rotary axes provide 45 degree steering resolution.

Once the rotary axis is determined, the direction that each delay update will apply to the transducer elements within the SAP is known. However, the number of updates and the timing of those updates must be determined. In some exemplary embodiments, the start, update and stop counters are determined by minimizing the mean delay error with respect to ideal dynamical delays for the elements in question.

The exemplary probe thereby approximates the delay curve with a piece-wise linear approximation, i.e., an initial static period, followed by one or more constant update rate periods, followed by another static period in the far-field. The magnitude of the delay updates and/or update rates/frequencies can be different based on the group 204 being delayed. In particular, although the magnitude of the delay updates can remain constant, the time period between updates may be adjusted for each group 204 to change the slope of the delay updates. In an alternative embodiment, the delay curve approximation can be non-linear to better resemble the ideal dynamical focusing delays or may include additional piece-wise linear segments.

Figure 10:
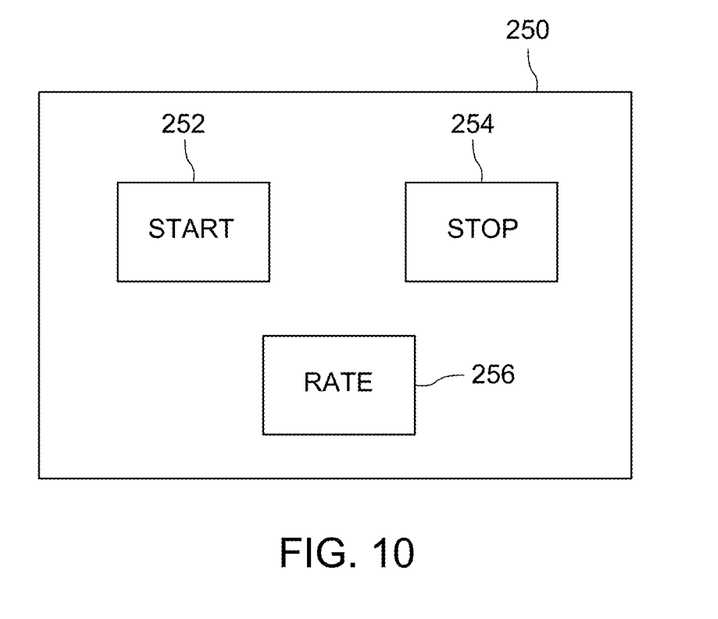
FIG. 10 shows a block diagram of an exemplary delay update timing controller for a sub-aperture processor.

FIG. 10 shows an exemplary block diagram of a delay update timing controller 250 that can be implemented within each of the SAPs (e.g., SAPs 48). With respect to FIG. 10, the controller 250 can include and regulate at least one counter, e.g., a start counter 252, a stop counter 254, a rate counter 256, and the like, for regulating the timing of the piecewise linear approximation of the delay updates. In some exemplary embodiments, one counter can act as the start counter 252, the stop counter 254, and the rate counter 256. In some exemplary embodiments, separate counters can be implemented to perform the functions of the start counter 252, the stop counter 254, and the rate counter 256. The controller 250 can apply an initial delay profile to the delay elements (e.g., delay elements 46) associated with each of the transducer elements 202, which remains constant for a period of time specified by the start counter 252. Once the start counter 252 reaches a specified value, e.g., a value predetermined by the controller 250, or counts down from a specified value to 0, the delay within the delay elements of the sub-aperture processor can be updated according to the groups 204 to which the transducer elements 202 are assigned. In one exemplary embodiment, some groups 204 can be incremented, some groups 204 can be decremented, and/or some groups 204 can remain static.

The delay updates can be incremented at some multiple (or factor/fraction) of the rate counter 256, which determines the time between updates. Thus, the magnitude of the delay may differ from one group 204 to the next, e.g., some delay elements can be updated at twice (or half) the rate or with twice (or half) the magnitude as compared to other delay elements 202. For example, based on the rate counter 256, delay updates can be applied at 100 nanosecond periods for groups A and E, 200 nanosecond periods for groups B and D, and not applied for group C. Thus, if a delay update magnitude is 1.0, group A can receive a delay increment of +1.0, group E can receive a delay increment of −1.0, group B can receive a delay increment of +0.5, group D can receive a delay increment of −0.5, and group C can receive a static delay, i.e., the signal would remain the same. In particular, in one embodiment, for one beam, groups A and B can receive a delay modification in one direction and groups D and E can receive a delay modification in the opposite direction. The number of updates can further be governed by the stop counter 254. The stop counter 254 may count the number of desired delay updates and, when the stop counter 254 reaches a specified value, e.g., a value predetermined by the controller 250, dynamic delay updates can be stopped by the sub-aperture processor. Once the delay updates are stopped, the delays for the delay elements associated with each of the transducer elements 202 can remain constant for the remainder of the beam receive period.

The assignment of dynamic delay update groups 204, the magnitude of the initial delay, and/or the magnitude of the delay updates can be reevaluated and reassigned by the controller 250 of the sub-aperture processor for each beam. Thus, the initial delay profile can be defined by the desired steering of the beam and can be updated for each beam, while the dynamic delay updates profile can be varied over time for each beam. The sub-aperture processor can further sum the ultrasound signals of all the transducer elements 202 of the SA (e.g., SA 42, 200) and implement one channel as an output of the SAP for the entire SA that can be communicated to the main processing unit external to the probe. Thus, for example, rather than implementing 25 channels for a 5×5 SA, one channel can be used, thereby reducing the number of cables or wires extending between the ultrasound probe and the main processing unit. Utilizing the piecewise linear approximation for the delays and subsequently combining the phase aligned signals into a single channel for each sub-aperture can significantly reduce the complexity for implementing a dynamic beamformer and may reduce the silicon area required. If the total circuitry needed for an element is less than or approximately equal to the size of the transducer element, the ASIC may be placed directly behind the transducer stack. The reduced silicon area can also be advantageous for the signal processing and power requirements of the ultrasound probe.

Figure 11:
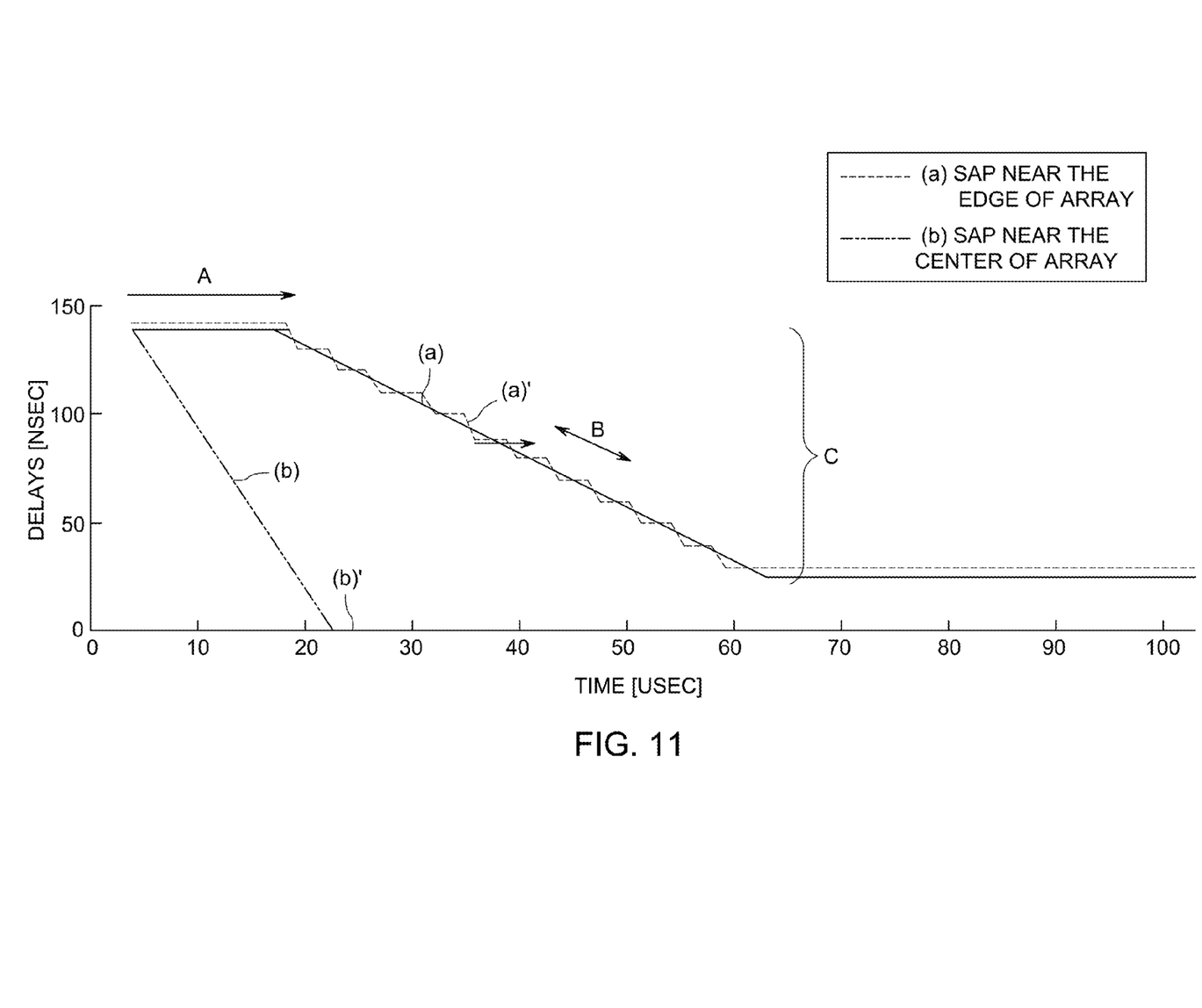
FIG. 11 shows an exemplary ideal steering profile for two exemplary sub-aperture shapes.

With reference to FIG. 11, an exemplary steering plot is illustrated for two SAPs at different positions on the aperture shown in FIG. 4. In particular, a SAP near the edge of the array of transducer elements is represented by piecewise linear curve (a) and approximated by curve (a)' and a SAP near the center of the array of transducer elements is represented by curve (b) and approximated by curve (b)'. As described above, an initial delay is applied during time period A to each SAP until a specified value is reached by the start counter 252. The delay update approximation is then applied during time period B to each SAP based on a rate determined by a rate counter 256. Once a specified number of delay updates have been reached at time period C, the stop counter 254 can stop the delay updates and a static delay remains for the remainder of the beam.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An ultrasound probe with sub-aperture processing capable of dynamic focus, comprising:
   an array of transducer elements that forms a sub-aperture in the ultrasound probe, wherein the transducer elements of the sub-aperture are configured to receive ultrasound signals, and wherein the transducer elements of the sub-aperture are divided into a plurality of dynamic delay update groups comprising at least a first group of transducer elements and a second group of transducer elements;
   a sub-aperture processor configured to:
      apply an initial delay to the transducer elements of the sub-aperture; and
      dynamically apply delay updates to the ultrasound signals associated with the transducer elements of the sub-aperture, wherein the delay updates are applied to the ultrasound signals repeatedly for a predetermined time period to approximate an ideal delay profile, and wherein a magnitude of the delay updates is dependent on the dynamic delay update groups.

2. The ultrasound probe of claim 1, wherein the sub-aperture processor is configured to:
   apply a first delay modification to the first group of transducer elements within the sub-aperture; and
   apply a second delay modification to the second group of transducer elements within the sub-aperture, wherein the first delay modification is different from the second delay modification.

3. The ultrasound probe of claim 2, wherein the first delay modification and the second delay modification are applied in different directions as a delay increment or a delay decrement.

4. The ultrasound probe of claim 2, wherein the dynamic delay update groups within the sub-aperture are updated at two or more different rates.

5. The ultrasound probe of claim 1, wherein the delay updates are a piecewise linear approximation of the ideal delay profile associated with the transducer elements in the dynamic delay update groups.

6. The ultrasound probe of claim 1, wherein the transducer elements of the sub-aperture are configured to transmit ultrasound signals, and wherein the sub-aperture processor is configured to apply the initial delay to the ultrasound signals to specify a focal point of the ultrasound signals.

7. The ultrasound probe of claim 1, wherein the sub-aperture processor is configured to apply the delay updates to the ultrasound signals to substantially align the ultrasound signals received by the transducer elements in phase for each of the dynamic delay update groups.

8. The ultrasound probe of claim 1, wherein the sub-aperture processor is configured to process a first beam with a first set of dynamic delay update parameters and a second beam with a second set of dynamic delay update parameters, and wherein the first set of dynamic delay update parameters are different from the second set of dynamic delay update parameters.

9. The ultrasound probe of claim 1, wherein the sub-aperture processor is configured to set a rate for applying discrete delay updates to the ultrasound signals associated with the transducer elements of the sub-aperture.

10. The ultrasound probe of claim 1, wherein the sub-aperture processor is configured to set a magnitude of the initial delay applied to the ultrasound signals associated with the transducer elements of the sub-aperture.

11. The ultrasound probe of claim 1, wherein the delay updates are one of an incremented delay, a static delay, or a decremented delay.

12. The ultrasound probe of claim 1, wherein the sub-aperture processor is configured to apply a set of initial delays to the ultrasound signals associated with the transducer elements of the sub-aperture, begin applying the delay updates to the ultrasound signals associated with the transducer elements of the sub-aperture in response to a start counter, continue applying the delay updates at intervals specified by a rate counter, and stop applying the delay updates to the ultrasound signals associated with the transducer elements of the sub-aperture in response to a stop counter.

13. An ultrasound system with a dynamic focus, comprising:
   an ultrasound probe comprising an array of transducer elements that form a sub-aperture, wherein the transducer elements of the sub-aperture are configured to receive ultrasound signals, and wherein the transducer elements of the sub-aperture are divided into a plurality of dynamic delay update groups comprising at least a first group of transducer elements and a second group of transducer elements;
   a sub-aperture processor configured to:

apply an initial delay to the transducer elements of the sub-aperture; and dynamically apply delay updates to the ultrasound signals associated with the transducer elements of the sub-aperture, wherein the delay updates are applied to the ultrasound signals repeatedly for a predetermined time period to approximate an ideal delay profile, and wherein a magnitude of the delay updates is dependent on the dynamic delay update groups.

14. The ultrasound system of claim 13, wherein the sub-aperture processor comprises at least one counter.

15. The ultrasound system of claim 14, wherein the sub-aperture processor is configured to apply the initial delay to ultrasound signals associated with the transducer elements, apply the delay updates in response to the at least one counter, apply discrete delay updates to the ultrasound signals associated with the transducer elements at a specified rate each time the at least one counter reaches a specified value, and stop the delay updates after completing a specified number of delay updates has been completed.

16. A method of receiving ultrasound signals with a dynamic focus, comprising:

applying an initial delay to ultrasound signals associated with transducer elements of a sub-aperture disposed in an ultrasound probe;

dividing the transducer elements of the sub-aperture into a plurality of dynamic delay update groups comprising at least a first group of transducer elements and a second group of transducer elements; and applying delay updates to the ultrasound signals associated with the transducer elements of the sub-aperture, wherein the delay updates are applied to the ultrasound signals repeatedly for a predetermined time period to approximate an ideal delay profile, and wherein a magnitude of the delay updates is dependent on the dynamic delay update groups.

17. The method of claim 16, further comprising transmitting the ultrasound signals via the transducer elements of the sub-aperture and applying the initial delay to the ultrasound signals via a sub-aperture processor to specify a focal point of the ultrasound signals.

18. The method of claim 16, further comprising receiving the ultrasound signals via the transducer elements of the sub-aperture and applying the delay updates to the ultrasound signals via a sub-aperture processor to substantially align the ultrasound signals received by the transducer elements in phase for each of the dynamic delay update groups.

19. The method of claim 16, further comprising processing a first beam using a first set of dynamic delay update parameters and a second beam using a second set of dynamic delay update parameters, wherein the first set of dynamic delay update parameters are different from the second set of dynamic delay update parameters.

20. The method of claim 19, further comprising applying different delay increments or decrements for the delay updates for each of the first and second sets of dynamic delay update parameters.

21. The method of claim 19, further comprising applying different delay update periods for the delay updates for each of the first and second sets of dynamic delay update parameters.

22. The method of claim 19, further comprising setting a rate for discretely applying the delay updates to the ultrasound signals associated with the transducer elements of the sub-aperture.

* * * * *